United States Patent

[11] 3,611,003

[72] Inventor George J. Frye
Portland, Oreg.
[21] Appl. No. 827,824
[22] Filed May 26, 1969
[45] Patented Oct. 5, 1971
[73] Assignee Tektronix, Inc.
Beaverton, Oreg.

[54] OSCILLOSCOPE SIGNAL SAMPLING SYSTEM
19 Claims, 2 Drawing Figs.
[52] U.S. Cl.................................................. 315/25
[51] Int. Cl..................................................... H01j 29/70
[50] Field of Search............................................ 315/18, 25

[56] References Cited
UNITED STATES PATENTS
3,456,189 7/1969 Hornak.......................... 315/25 X OTHER REFERENCES
Sugarman, Sampling Oscilloscope for Statistically Varying Pulses, Review of Scientific Instruments, Vol. 28, # 11, 933-938
McQueen, The Montoring of High Speed Waveforms, Electronic Engineering, Oct. 1952, pp. 436-441

Primary Examiner—Rodney D. Bennett, Jr.
Assistant Examiner—Brian L. Ribando
Attorney—Buckhorn, Blore, Klarquist and Sparkman ABSTRACT: Horizontal deflection in a sampling oscilloscope is accurately determined by measuring the time difference between the occurrence of a triggering signal and the occurrence of a strobe or sample-producing signal. For measuring this time difference, a net charge of a first polarity is accumulated in response to a first sequence of these signals, the value of the charge accurately indicating such time difference. If the signal sequence is reversed, a charge of a second polarity is accumulated with the value of the charge again being an accurate measure of the time difference. The charge value controls the magnitude of the oscilloscope's horizontal deflection, and the charge polarity controls the deflecting direction.

PATENTED OCT 5 1971 3,611,003

GEORGE J. FRYE
INVENTOR

BY
BUCKHORN, BLORE, KLARQUIST & SPARKMAN
ATTORNEYS

OSCILLOSCOPE SIGNAL SAMPLING SYSTEM

BACKGROUND OF THE INVENTION

Prior sampling oscilloscope systems have been of two general kinds. A first or sequential sampling system derives a triggering signal from each repetition of the input signal and samples each input signal repetition at a slightly later time with respect to the triggering signal. A cathode-ray tube presentation is then made up of these successive samples. In this way a very high speed signal can be portrayed employing oscilloscope circuitry operating at a lower speed, since the oscilloscope circuitry does not have to respond to the full input waveform but need only respond to and portray a small sample during each input signal repetition period.

A typical sequential sampling system generates a fast timing ramp waveform for each triggering signal. This timing ramp waveform is compared with a reference voltage derived from a staircase generator. When the ramp compares with this reference voltage, a strobe is produced and is used to sample a small portion of the input signal for presentation on the CRT. Then the staircase generator is set to its next level whereby the fast ramp must reach a greater value before comparing therewith for producing the next sample. Thus the fast ramp will then take longer in comparing with the increased or stepped reference voltage, and, as a consequence, the next sample will be taken at a slightly later point along the input waveform.

The reference voltage from the staircase generator is employed for bringing about the oscilloscope's horizontal deflection for each sample, inasmuch as the value thereof represents the time interval before each sample is taken. Each time the staircase generator produces a new output level, it also causes the cathode-ray tube's horizontal deflection apparatus to place a new sample slightly to the right of the previous sample in order to make up a composite presentation representative of the original input signal waveform.

Certain difficulties arise with a system of this kind. First, a delay line is conventionally employed in the signal channel ahead of the sampler, e.g. if the portion of the signal corresponding to the triggering event is to be viewed. Use of a delay line or the like brings about distortion of the input signal, especially when the input signal includes very high frequency components. Also, the circuit used to compare the level of the fast ramp with the reference voltage of the staircase generator must have a fairly wide bandwidth in order to introduce minimum delay between the moment of comparison and the activation of a strobe signal. The high bandwidth comparison circuit will necessarily be characterized by relatively high noise, resulting in a jitter in comparison, inversely proportional to the slope of the fast ramp signal. Furthermore, the fast ramp signal is characterized by transients introduced when current is switched for starting the ramp, and these transients persist for a finite period of time. These transients introduce nonlinearities when the fast ramp is compared with the reference voltage from a staircase generator. As a result of comparison jitter and nonlinearities in the fast ramp waveform, the strobe signal may or may not occur at a time supposedly set by the reference voltage from the staircase generator. That is, the reference voltage from the staircase generator may not be a very good measure of the sampling time because of jitter and nonlinearities. As a result, considerable jitter occurs in the horizontal positioning of the resultant signal.

A second type of sampling system is a random sampling system wherein the sampling of a signal is not directly responsive to a triggering signal. Rather, a pretrigger signal may be generated, e.g. in advance of the triggering signal, by a circuit which measures the rate of prior triggering signals. A fast ramp is produced in response to a pretrigger signal and this fast ramp is compared with a reference voltage from a staircase generator as in the sequential sampling system. When the fast ramp compares with the reference voltage, a sample of the input signal is taken for display. A circuit is employed for then ascertaining the difference in time between the strobe signal, which accomplished the sampling, and a triggering signal, which may have occurred after the pretrigger signal. Horizontal deflection is then accomplished in accordance with the measurement of the time difference. This circuitry has the advantage that the input signal itself need not be delayed, inasmuch as sampling may actually be accomplished prior to the reception of a triggering signal. However, in order to measure the time difference between the triggering signal and the strobe or sampling signal, for thereby ascertaining the horizontal positioning of the sample on a cathode-ray tube screen, delay of the strobe signal has been necessary prior to measurement of the time between the triggering signal and the strobe signal. This delay of the strobe signal before measurement of the time difference introduces jitter into the resultant display, as the usual delay line is characterized by rise time difficulties and the like.

SUMMARY OF THE INVENTION

According to the present invention, a sampling signal or strobe signal is generated when a fast timing ramp waveform compares with a predetermined reference level. This fast timing ramp waveform may be started either by a triggering signal, or a pretrigger signal, the time of which is predicted from past trigger information. The cathode-ray tube vertical deflection is responsive to the value of the sample taken, but the horizontal cathode-ray tube deflection is not responsive to the aforementioned reference level. Instead, the time difference is measured between the sampling or strobe signal and the triggering signal. This measurement is made directly, and is substantially free of delay added to either signal. Therefore when the horizontal deflection is provided in response to such measurement, horizontal jitter in the resultant display is materially reduced.

In accordance with the system of the present invention, either sequential operation or random sampling operation may be provided. When random operation is employed, the triggering signal can occur either before or after a sampling or strobe signal. In the system according to the present invention, the horizontal deflection of the oscilloscope's cathode-ray tube beam is produced in accordance with both the value and sign of the time difference between the triggering signal and the strobe signal. In accordance with a particular embodiment of the present invention, a charge is accumulated or integrated for measuring the time difference between the triggering signal and the strobe signal and the net charge may be either positive or negative depending on the sequence of these signals. The horizontal deflection is in proportion to the charge accumulation and its direction is in accordance with the sign of said charge.

It is accordingly an object of the present invention to provide an improved sampling oscilloscope system exhibiting materially less jitter than heretofore experienced.

It is another object of the present invention to provide an improved sampling oscilloscope system capable of either sequential or random operation.

It is another object of the present invention to provide an improved sampling oscilloscope system having improved horizontal deflection means.

It is another object of the present invention to provide an improved time base system for a sampling oscilloscope.

It is a further object of the present invention to provide an improved sampling time base system substantially free of incremental timing nonlinearities.

It is a further object of the present invention to provide an improved time measurement system capable of making measurements between a pair of events wherein the sign of the output provided is in accordance with the sequence of those events.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
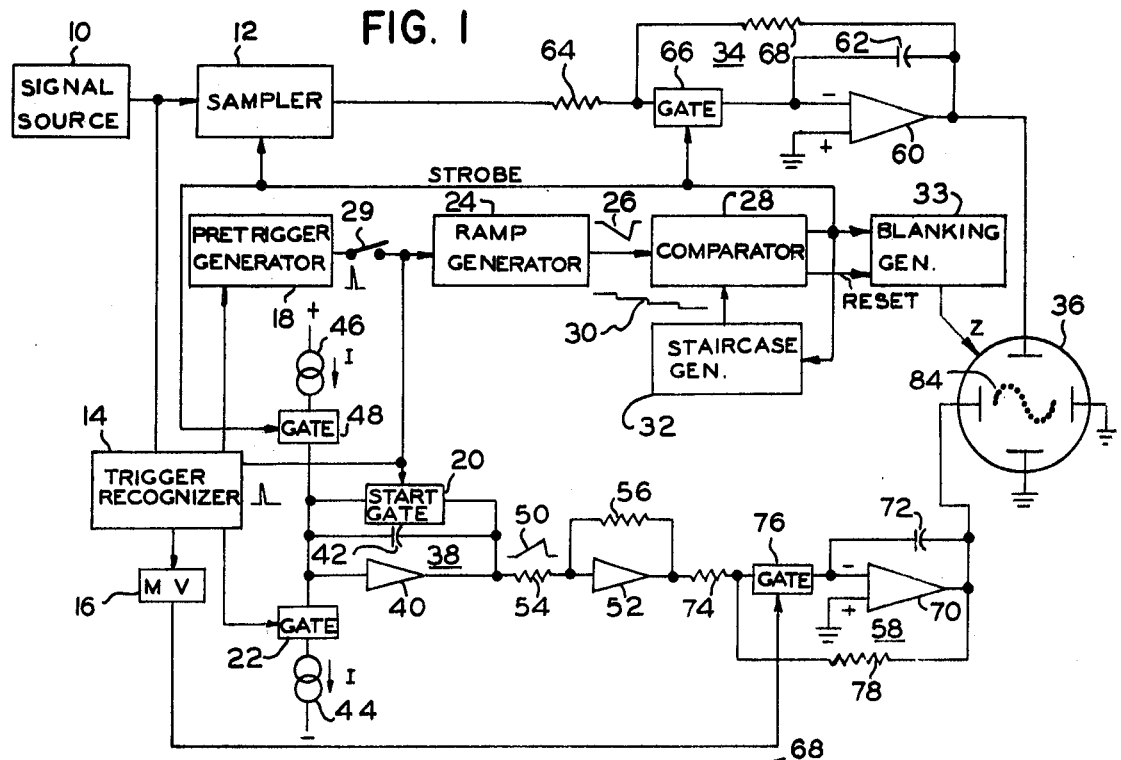
FIG. 1 is a block diagram of a first embodiment of the present invention.

Referring to FIG. 1, a first sampling system according to the present invention is provided a repetitive input signal waveform from a signal source 10. The input waveform is applied both to a sampler 12, and to a trigger recognizer 14 wherein a trigger pulse is generated coincident with a selected part of the input waveform. This triggering signal is applied to a delay multivibrator or holdoff multivibrator 16 employed for timing purposes. The triggering signal from block 14 is also applied to pretrigger generator 18, integrator start gate 20, fast ramp generator 24, and to current gate 22.

Pretrigger generator 18 is a ratemeter which measures the rate of triggering signals from trigger recognizer 14 and provides a pretrigger pulse at a predetermined time before a next occurring triggering signal. An example of the circuit of this kind is described and claimed in my copending application entitled, "Triggering Method and Apparatus," Ser. No. 616,895, filed Feb. 15, 1967, and assigned to the assignee of the present invention. The output of pretrigger generator 18 is selectively applied to fast ramp generator 24 and to start gate 20 by means of switch 29.

Fast ramp generator 24, which suitably comprises a Miller integrator, produces a substantially linear negative-going ramp output waveform 26 which is applied to comparator 28 together with a staircase waveform 30 from staircase generator 32. The steps in the staircase 30 are appreciably longer in duration than waveform 26. When ramp generator 24 is operated to provide a ramp waveform 26, either in response to a triggering signal from trigger recognizer 14 or from pretrigger generator 18, the ramp waveform 26 is compared in comparator 28 with one of the steps of step waveform 30. When the ramp waveform 26 reaches the voltage of such step, comparator 28 produces a sampling or strobe output which, among other things, steps staircase generator 32 to the next lower step or level. As a result, the next comparison between waveforms 26 and 30 will occur at a slightly later time relative to a triggering signal or pretrigger signal, and therefore at a slightly later time with respect to a subsequent recurrence of the input signal waveform.

Each time a strobe output is produced from comparator 28, sampler 12 gates a small sample of the input waveform amplitude from signal source 10 into vertical memory 34, and from there to the vertical deflection plates of cathode-ray tube 36. Thus, as in other sampling systems, the electron beam of cathode-ray tube 36 will be caused to deflect vertically in accordance with successive samples taken from recurrences of an input waveform, at progressively later times with respect to the input waveform, so as to represent such waveform at a relatively slow rate. The strobe output of comparator 28 is also applied to blanking generator 33 which controls the Z-axis circuitry of cathode-ray tube 36 whereby an electron beam trace is controllably presented.

The circuit according to the present invention also includes a timing integrator 38 comprising a Miller integrating circuit including an amplifier 40 shunted by timing feedback capacitor 42 as well as by start gate 20. The timing integrator 38 receives a negative current input from negative current source 44 via gate 22, and/or a positive current input from positive source 46 via gate 48. The timing integrator 38 functions to provide a substantially linear positive-going ramp output (indicated at 50) in response to a negative current from source, 44, or a linear negative-going ramp output in response to a positive current from source 46. Sources 44 and 46 provide equal currents, I, and if both gates 22 and 48 are conducting, the integrator 38 will produce no output, even if the start gate 20 is made nonconducting. Integrator 38, when it is provided with a constant current from source 44 or source 48 operates as a linear integrator, and the voltage which a waveform (e.g. waveform 50) reaches will be determined from the length of time a current from a current source is applied to the input of the integrator.

The output waveform of integrator 38 is applied to an operational amplifier circuit including amplifier 52 having its input coupled to the output of integrator 38 by way of resistor 54, and having a feedback resistor 56 disposed thereacross. The output of the operational amplifier is in turn applied to horizontal memory 58.

Vertical memory circuit 34 includes an amplifier 60 having positive and negative inputs wherein an inverted output is produced in response to an input at the negative terminal. The positive input is grounded, and a feedback capacitor 62 is connected between the output of amplifier 60 and its negative input. The output of sampler 12 is selectively applied to the negative input of amplifier 60 through resistor 64 and gate 66 disposed in that order between sampler 12 and amplifier 60. Gate 66 is operated in response to the strobe signal from comparator 28, but is so operated for a somewhat longer time than is sampler 12. A feedback resistor 68 connects the output of amplifier 60 to the input of gate 66.

Vertical memory 34 is voltage-input sensitive and functions as an operational amplifier when gate 66 is conductive. Then, when gate 66 becomes nonconductive, the applied input voltage is stored in vertical memory 34 and is substantially constantly available for the vertical deflection system of cathode-ray tube 36. The circuit functions at this time as a Miller circuit maintaining the charge on capacitor 62.

The horizontal memory 58 is substantially identical and operates in substantially similar fashion. Here, amplifier 70 is provided with positive and negative inputs, with the positive input being grounded and capacitor 72 coupling the amplifier output to the negative input. Also, resistor 74 and gate 76 disposed in that order couple the output of the operational amplifier circuit, including amplifier 52, to the negative input of amplifier 70. Feedback resistor 78 is interposed between the output of amplifier 70 and the input of gate 76, while gate 76 is timed in its operation by multivibrator 16. When the gate 76 is rendered conductive by means of multivibrator 16, the then quiescent output of integrator 38 is coupled into horizontal memory 58, and from there to the horizontal deflection plates of cathode-ray tube 36. As will hereinafter become more evident, the charge in integrator 38 is an accurate measure of the desired horizontal deflection for the cathode-ray tube's electron beam. It is noted that as in the case of memory 34, memory 58 applies a constant stored voltage to the deflection apparatus for a relatively long period of time.

Considering the operation of the FIG. 1 circuit in greater detail, sequential sampling will first be described, i.e. with switch 29 open. This is the more or less conventional type of sampling wherein a triggering signal is derived from the signal source 10 by means of a trigger recognizer 14, and whereby the triggering event must therefore take place before the sampling can take place. This arrangement is quite practical where the triggering event or portion of the waveform from which triggering is derived takes place before that portion of the waveform which is to be viewed on the cathode-ray tube. Alternatively, some triggering signal may be derived in direct synchronism with the input signal and occurring before the input signal, but not forming a part thereof. During each successive repetition of the input signal, a sample of the amplitude of the input signal is taken at a successively slightly later time with respect to the triggering signal. Thus, for each repetition of the input signal, only a very small sample thereof in the form of a spot or dot is displayed on the cathode-ray tube 36, and the next sample will await the next repetition of the input signal. Due to the spot position retention of horizontal and vertical memories and the presumed speed and high repetition of the input signal, the sampling method is a convenient means for accurately portraying high speed signals which might not otherwise be displayable on a cathode-ray oscilloscope.

Let us assume initially that gates 20, 22, and 48 are conducting, i.e. that they are normally closed. When a triggering signal appears at the output of trigger recognizer 14, start gate 20 is rendered nonconducting such that capacitor 42 is no longer shorted. Gate 22 is also rendered nonconducting and as a consequence thereof, a current I can be delivered to integrator 38 from current source 46. Therefore, the integrator 38 will run down or produce a negative-going linear output until such time as gate 48 is rendered nonconducting.

At the same time, a triggering signal from trigger recognizer 14 operates fast ramp generator 24 for producing a linear negative-going ramp output 26. When this ramp output 26 drives the comparator 28 past the reference voltage of the particular step output produced by staircase generator 32, comparator 28 supplies a strobe signal. This strobe signal operates gate 48 for rendering the same nonconductive. Thus, the voltage on capacitor 42 and delivered at the output of amplifier 40 becomes a measure of the time between the triggering signal from trigger recognizer 14 and the strobe signal from comparator 28. The voltage on capacitor 42, especially after a comparatively long period of time, is determined by the size of the capacitor and the charge delivered thereto by current source 46. The voltage stored on capacitor 42 is a true measure of the time between the triggering signal and the strobe signal, but may be significantly different from the level of the staircase generator's output waveform 30 at the time, depending upon comparator jitter, transient nonlinearities of ramp 26, and the like.

The strobe signal from comparator 28 also operates sampler 12 for taking a small sample of the signal from source 10 and delivering the same to amplifier 60 via resistor 64 and gate 66. Gate 66 is operated at substantially the same time, but for a slightly longer period of time. At the conclusion of operation of gate 66, the sample value will be stored in vertical memory 34 for application to the vertical deflection plate of cathode-ray tube 36. However, the strobe signal from comparator 28 also operates blanking generator 33 so that electron beam in cathode-ray tube 36 is blanked at this time. As hereinbefore indicated, the strobe signal also steps staircase generator 32 down one step, so as to be ready for the next comparison.

Now, the vertical deflection value for a particular sampling dot will be stored in vertical memory 34, and also the operational amplifier circuit including amplifier 52 applies the stored output of integrator 38 to the horizontal memory 58. At a sufficient time after the occurrence of a triggering signal from trigger recognizer 14 for the value on integrator 38 to become stabilized, holdoff multivibrator 16 operates gate 76 of memory 58, and the output from integrator 38 becomes stored in horizontal memory 58. The operation of holdoff multivibrator 16 is programmed to occur sufficiently after ramp 26 so that the output of integrator 38 will be a very constant value. The output of integrator 38 as now stored on horizontal memory 58 is applied to the horizontal plate of cathode-ray tube 36, and since this voltage is an accurate measure of the time between a triggering signal and a strobe signal, it is an accurate measure of the exact horizontal position for a dot on the cathode-ray tube.

When ramp 26 runs down to a preset maximum value, ramp generator 24 and comparator 28 reset, and comparator 28 in turn will reset blanking generator 33. Blanking generator 33 then permits the electron beam to unblank, and the stored values of memories 34 and 58 cause the tube's electron beam to be directed to the correct position both horizontally and vertically for a particular sample dot display. The electron beam remains at this sampling position until a strobe signal again occurs for taking a next sample at which time the electron beam will be temporarily blanked by generator 33. Blanking continues until both memories 34 and 58 store the correct values for the next sample. After holdoff multivibrator 16 has operated gate 76, gates 20, 22, and 48 are suitably rendered conductive by holdoff multivibrator 16 (via connections not shown to preserve clarity) in anticipation of the next sampling operation.

After the complete waveform has been displayed once by means of a plurality of dot samples, as indicated at 84 in FIG. 1, the staircase generator 32 will have stepped down a number of steps equal to a preset number of samples, and the staircase generator then resets itself to its highest step and starts down again for a repetition of the complete waveform 84. As will be appreciated, the sampling occurs rapidly enough for a substantially continuous presentation on the face of the cathode-ray tube. In a typical instance, samples were produced every 20 microseconds, and the complete waveform display was presented every 20 milliseconds. The time between the occurrence of a triggering signal from trigger recognizer 14 and the operation of holdoff multivibrator 16 to cause gate 76 to be conductive was 10 microseconds. The time between the triggering signal and the operation of gates 20, 22, and 48 for again rendering the same conductive was about 12 microseconds. Naturally these figures may vary for different sampled waveforms.

The present circuit, in addition to sequential operation, is also capable of random operation. According to random operation, samples are suitably taken at successively later times with respect to successive repetitions of an input waveform, but not in response to a triggering signal derived from the input waveform. As hereinbefore mentioned, pretrigger generator 18 comprises a ratemeter which produces outputs at the rate of triggering signals from trigger recognizer 14, and at times before the occurrence of each such triggering signal. Therefore, a sample taken in response to an output from pretrigger generator 18 may sample a portion of the waveform which actually later gives rise to operation of trigger recognizer 14, and an early portion of the signal waveform can be viewed. Random samplers as heretofore known in the art then ascertain the time difference between a triggering signal and a strobe signal, and horizontally deflect the cathode-ray tube's electron beam in accordance with this time difference. However, it was heretofore necessary to include a delay circuit for delaying the strobe signal before measurement of the time difference between the triggering signal and the strobe signal. As will hereinafter become more evident, no delay of the strobe signal is required before measurement of time difference between the strobe signal and the triggering signal in accordance with the present invention.

For random operation, switch 29 is closed, and the generation of output by pretrigger generator 18 starts ramp generator 24 so that waveform 26 starts to run down. At the same time, gate 20, initially conductive, is now rendered nonconductive so that capacitor 42 is no longer shorted. However, gates 22 and 48, initially conductive, both remain conductive and therefore capacitor 42 charges in neither direction. Now, if a triggering signal occurs first at the output of trigger recognizer 14, gate 22 is rendered nonconducting, and the integrator 38 starts producing a negative-going output waveform. Then, when a strobe signal occurs, gate 48 is rendered nonconducting. The voltage at the output of integrator 38 will then be a true measure of the time difference between the occurrence of the triggering signal from trigger recognizer 14 and the occurrence of the strobe signal from comparator 28. The horizontal deflection information for oscilloscope 36 is derived from integrator 38 as hereinbefore described, and the sampling operation by means of the strobe signal is also as hereinbefore described.

Now if the strobe signal occurs before a triggering signal from trigger recognizer 14, gate 48 will be rendered nonconducting while gate 22 remains conducting. As a result, integrator 38 will produce a positive-going linear ramp waveform. This ramp waveform subsequently concludes when a triggering signal occurs at the output of trigger recognizer 14 which renders gate 22 nonconducting. The just-described situation corresponds to sampling of a part of the input waveform occurring before the triggering signal is produced. It is noted, however, that no delay is employed in the strobe signal path for making one signal consistently occur before the other as measured. Rather, the integrator 38 charges in opposite directions according to the sequence of signal events. Then, when gate 76 is subsequently operated, the value reached by integrator 38 will be applied to the horizontal memory 58 and the horizontal deflection plates of cathode-ray tube 36.

In a typical instance, if the triggering signal occurs before the strobe, the particular sample would appear to the right of center on the cathode-ray tube presentation, while if the strobe appears before the triggering signal, the sample presentation would be to the left of center. In an instance where the strobe occurs at the same time as the triggering signal, then integrator 38 produces no output at all, and the horizontal memory 58 stores zero volts leading to no horizontal deflection of the electron beam. Of course, bias voltages may be added to the horizontal deflection apparatus so that the complete sampled waveform may be positioned wherever desired.

It is then seen that the present invention employs a charge measurement system wherein a first sequence of the triggering signal and the strobe signal provides a charge of a first polarity, the value of which is an accurate measurement of the time between signals, and wherein the second sequence produces a charge of the opposite polarity and the value of which is again a measure of the time difference between the signals. Thus, time is conveniently measured either positively or negatively without employing a delay means. Since a delay means is not employed, the jitter and nonlinearities associated therewith are also avoided.

The reduction of jitter and nonlinearity problems in the present invention then results from accurately measuring the true time difference between a triggering signal and a strobe signal to produce the correct horizontal deflection of the display, rather than relying on the output of a staircase generator to provide this horizontal deflection value, and from accomplishing measurement without using delay means which would introduce jitter and which would be characterized by rise time problems.

Figure 2:
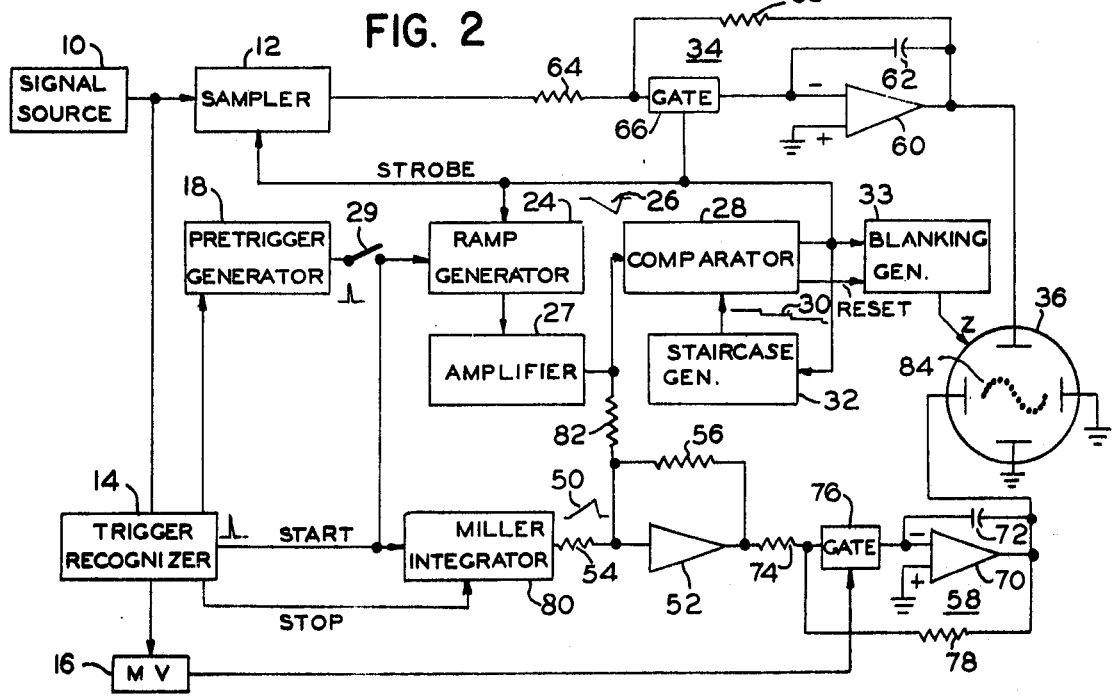
FIG. 2 is a block diagram of a second embodiment of the present invention.

Although the FIG. 1 circuit is preferred for reasons of simplicity and ease of operation, the principles of the present invention can also be realized in a circuit of the type illustrated inn FIG. 2. In the FIG. 2 embodiment, similar elements are referred to employing similar reference numerals. A principal difference of this circuit relates to the means whereby the horizontal deflection signal for a cathode-ray tube 36 is produced. In the FIG. 2 embodiment, the operational amplifier circuit including amplifier 52 receives an input from both Miller integrator 80 and from fast ramp generator 24 by way of an isolating amplifier 27. Amplifier 27, which suitably comprises a cathode follower, is coupled to the input of amplifier 52 by way of input resistor 82, and amplifier 27 also drives comparator 28. It is found desirable to include amplifier 27 for proper circuit operation in the FIG. 2 embodiment. It is also noted that a strobe output from comparator 28 shuts off or concludes ramp waveform 26 from ramp generator 24 in the case of the FIG. 2 embodiment.

Further in regard to the FIG. 2 embodiment, Miller integrator 80 is substantially similar in construction to integrator 38 in the prior embodiment except that only one start input and only one stop input are applied from trigger recognizer 14. The start input causes the Miller integrator 80 to start producing a positive-going linear ramp output 50, while the stop input concludes such ramp. It will therefore be apparent that if both start and stop inputs are applied to Miller integrator 80 from trigger recognizer 14, then no output will be produced. However, a start input may also be provided Miller integrator 80 from pretrigger generator 18 via switch 29. In the event switch 29 is closed and pretrigger generator 18 produces an output pulse, then Miller integrator 80 will start charging until a pulse is produced from trigger recognizer 14, at which time the charging will stop.

Miller integrator 80 is equipped with a current source and a capacitor (not shown in FIG. 2) that will result in a waveform 50, opposite in polarity but equal in slope to that of the fast ramp waveform 26. The waveforms 26 and 50 are added at the input of the operational amplifier circuit including amplifier 52, and the latter produces an output proportional to the difference in the duration of output ramp waveform 50 as compared to output ramp waveform 26.

Considering operation of the FIG. 2 embodiment in a sequential mode, i.e. with switch 29 open, a triggering signal from trigger recognizer 14 causes ramp generator 24 to start running down whereby waveform 26 is produced. Both start and stop commands are applied to Miller integrator 80, and therefore the output of Miller integrator 80 remains quiescently at zero level. Ramp waveform 26 continues to run down until amplifier 27 drives comparator 28 past a reference voltage level established by one of the levels of waveform 30. At this time comparator 28 produces a strobe pulse. The electron beam from the cathode-ray tube is blanked since blanking generator 33 is actuated by the strobe pulse, and as hereinbefore mentioned, the staircase generator 32 is also stepped down by one step. The strobe pulse as applied to sampler 12 and gate 66 causes the particular voltage level of the input signal at this time to be stored on vertical memory 34. Also, the strobe signal is used to stop ramp waveform 26. The resultant voltage level stored in ramp generator 24, after a relatively long period of time, is determined by the charge delivered to ramp generator 24 up to the time sampling took place. Assuming a relatively constant current source is employed for charging a Miller capacitor in ramp generator 24, the resultant voltage stored in ramp generator 24 is a true measure of the time between the triggering event and the strobe event. The voltage level stored on ramp generator 24 may be significantly different from the reference voltage provided by staircase generator 32, depending upon comparator jitter and ramp nonlinearities. Thus, we have produced a voltage which will accurately indicate where to place a sample horizontally on cathode-ray tube 36 relative to the rest of the samples.

Amplifier 27 delivers this voltage level to the operational amplifier circuit including amplifier 52 and from there to the horizontal memory 58. Holdoff multivibrator 16 operates gate 76 at a time sufficiently long after the triggering signal from trigger recognizer 14 whereby the output of ramp generator 24 will have settled down to a stable value. This value will now be applied to and stored upon the capacitor 72 of horizontal memory 58, and therefore will be applied to the horizontal deflection plates of cathode-ray tube 36. Subsequently, when comparator 28 resets, blanking generator 33 unblanks the electron beam of cathode-ray tube 36, and a dot representing the sample information appears on cathode-ray tube 36 at the correct vertical and correct horizontal positions with very little jitter.

For a random sampling mode, switch 29 is closed, and pretrigger generator 18 produces its output pulse at a preset time before the next triggering signal arrives. Ramp generator 24 and Miller integrator 80 are both started at the same time, and as hereinbefore noted, both circuits are adapted to provide an output of substantially the same slope but of opposite polarity. When the triggering signal is produced from trigger recognizer 14, substantially coinciding with a portion of an input signal waveform, the Miller integrator 80 is stopped, and therefore collects no more charge. Miller integrator 80 settles out at a level determined by the relative time between the triggering signal from pretrigger generator 18 and the triggering signal from trigger recognizer 14. Then, as before, when waveform 26 runs down to a value established by staircase generator 32, comparator 28 provides a strobe signal, and the signal input is sampled as hereinbefore described. Again, at this time, ramp generator 24 is stopped. The operational amplifier circuit including amplifier 52 produces an output proportional to the difference of the concluding levels of ramp generator 24 and Miller integrator 80. In the present example, this difference is an accurate measure of the time difference between the triggering signal from trigger recognizer 14 and the strobe from comparator 28. This difference as applied to horizontal memory 58 will cause the proper horizontal deflection and horizontal positioning of the input signal substantially without jitter.

If a comparison is reached and a strobe signal is produced by comparator 28 before a triggering signal output occurs from trigger recognizer 14, the final voltage on Miller integrator 80 will be larger than that on ramp generator 24. This, of course, corresponds to sampling of the input waveform in an early portion thereof before a triggering signal was produced. As a result, the difference at the output of amplifier 52 will have the opposite sign, and consequently, the horizontal deflection in cathode-ray tube 36 will be negative. However, it is important to note that the horizontal deflection is still substantially without jitter, and moreover, no delay networks or the like are employed which might lead to or aggravate jitter. That is, this lack of jitter is made possible in large part by the absence of delay networks in the signal or triggering channels.

While I have shown and described preferred embodiments of my invention, it will be apparent to those skilled in the art that many changes and modifications may be made without departing from my invention in its broader aspects.

I claim:

1. A method of displaying an input waveform on a cathode-ray tube of an oscilloscope, said method comprising:
   generating a triggering signal in response to an occurrence of the input waveform,
   generating a timing ramp waveform,
   generating a sampling signal when said timing ramp waveform makes a predetermined comparison with a predetermined reference level,
   taking a sample of the input waveform in response to the sampling signal for the purpose of deflecting the cathode-ray tube's electron beam in a first sense in accordance with the amplitude value of said sample,
   directly measuring the time of the sampling signal with respect to the triggering signal as said signals occur, substantially free of delay added to either signal,
   and causing deflection of the cathode-ray tube's electron beam in a second sense in accordance with the said measurement of the time of the sampling signal with respect to the said triggering signal.

2. The method according to claim 1 wherein said measuring is accomplished by generating a ramp waveform starting with one of said signals and concluding with the other and ascertaining the final value of such ramp waveform.

3. The method according to claim 1 including measuring the time of the sampling signal with respect to the triggering signal by accumulating a net charge of a first polarity in accordance with a first sequence of said signals and accumulating a net charge of a second polarity in accordance with a second sequence of said signals, and wherein said deflection in said second sense is in accordance with the value and polarity of said accumulated charge.

4. The method according to claim 1 wherein the said deflection of the cathode-ray tube's electron beam in a second sense is produced in accordance with the value of said measurement and in accordance with the sequence of said signals, with a difference in the sequence of said signals causing deflection in relatively opposite directions.

5. The method according to claim 4 wherein said timing ramp waveform is started by a prepulse provided before said triggering signal in accordance with the rate of occurrence of the previously occurring triggering signals.

6. The method according to claim 1 wherein said timing ramp waveform is started by said triggering signal.

7. A method of displaying a representative input waveform on an oscilloscope comprising the steps of:
   generating a triggering signal in response to an occurrence of the input waveform,
   generating a ramp waveform in response to said triggering signal,
   taking a sample of said input waveform when said timing ramp reaches a reference level for the purpose of deflecting the cathode-ray tube's electron beam in a first sense in accordance with the amplitude value of said sample,
   and causing deflection of the cathode-ray tube's electron beam in a second and orthogonal sense in proportion to the measured level actually reached by said ramp waveform when said sample is taken.

8. The method according to claim 7 including stopping said ramp when said sample is taken and ascertaining the value of said deflection in said orthogonal sense at a time subsequent to the stopping of said ramp.

9. In a sequential sampling system for a cathode-ray oscilloscope, the method comprising:
   Sampling an input signal when a timing waveform makes a predetermined comparison with a predetermined reference value,
   measuring the time between the occurrence of said input signal and the time of sampling thereof, independently of said reference value,
   and deflecting the oscilloscope's electron beam in accordance with said measurement.

10. A system for displaying an input waveform on a cathode-ray tube of an oscilloscope, said system comprising:
    means for generating a triggering signal in response to an occurrence of the input waveform,
    means for generating a timing ramp waveform,
    means for generating a sampling signal when said timing ramp waveform makes a predetermined comparison with a predetermined reference level,
    means for taking a sample of the input waveform in response to the sampling signal for the purpose of deflecting the cathode-ray tube's electron beam in a first sense in accordance with the value of said sample,
    means for directly measuring the time of occurrence of the sampling signal with respect to the triggering signal as said signals occur, substantially free of delay added to either signal,
    and means for causing deflection of the cathode-ray tube's electron beam in a second and substantially orthogonal sense in accordance with the said measurement of time of the sampling signal with respect to the said triggering signal.

11. The system according to claim 10 wherein said means for measuring comprises a charging means for providing a ramp waveform started by one of said signals and concluded by the other, the stored charge providing said measurement.

12. The system according to claim 10 wherein said means for measuring the time of the sampling signal with respect to the triggering signal comprises means for accumulating a net charge of a first polarity in accordance with a first sequence of said signals and for accumulating a net charge of a second polarity in accordance with a second sequence of said signals, the said deflection in said second sense being in accordance with the value and polarity of said accumulated charge.

13. The system according to claim 12 including means for starting said timing ramp waveform by said triggering signal.

14. The system according to claim 13 including means for providing a prepulse before said triggering signal in accordance with the rate occurrence of the previously occurring triggering signals, and switching means for alternatively starting said timing ramp waveform by said prepulse.

15. The system according to claim 12 wherein said means for accumulating a net charge comprises a Miller integrator and current supply means therefor responsive to a first sequence of said signals to provide current in a first direction to said integrator and responsive to a second sequence of said signals for supplying current in the opposite direction to said integrator, said means for causing deflection being subsequently responsive to the charge on said integrator.

16. The system according to claim 15 including means for selectively starting said timing ramp waveform by a prepulse provided before said triggering signal in accordance with the rate of occurrence of the previously occurring triggering signal, means connecting said prepulse for enabling operation of said Miller integrator, and gating means responsive to a first sequence of said signals for enabling the delivery of current in said first direction to said Miller integrator and responsive to the opposite sequence for enabling delivery of current in said opposite direction to said Miller integrator.

17. The system according to claim 16 wherein said gating means comprises a first gate connected in series with a first current source which gate is responsive in its operation to a triggering signal, and a second gate in series with a second current source, said second gate being responsive in its operation to a sampling signal.

18. The system according to claim 12 wherein said means for accumulating net charge includes first and second ramp waveform generators.

means for selectively starting the ramp waveforms of both generators by a prepulse provided before said triggering signal in accordance with the rate of occurrence of previously occurring triggering signals, means for stopping one ramp waveform generator in response to said triggering signal, means for stopping the other ramp waveform generator in response to said sampling signal, and means for determining the difference between the output of the two ramp waveform generators and for coupling said difference to said means for causing deflection of the cathode-ray tube's electron beam.

19. The system according to claim 12 wherein said means for accumulating a net charge includes said means for generating a timing ramp waveform and further includes a Miller integrator adapted to produce a similar but opposite polarity ramp waveform, means for selectively starting both ramp waveforms by a prepulse provided before said triggering signal in accordance with the rate of occurrence previously occurring triggering signals, means for stopping said Miller integrator ramp in response to said triggering signal, means for stopping said timing ramp waveform in response to said sampling signal, and means for determining the difference between the output of the means for generating a timing waveform and of the Miller integrator and for coupling said difference to said means for causing deflection of the cathode-ray tube's electron beam.

PO-1050
(5/69)

UNITED STATES PATENT OFFICE
CERTIFICATE OF CORRECTION

Patent No. 3,611,003        Dated October 5, 1971

Inventor(s) GEORGE J. FRYE

It is certified that error appears in the above-identified patent and that said Letters Patent are hereby corrected as shown below:

In the claims:

Col. 10, line 65, insert -- of -- between "rate" and "occurrence".

Col. 12, line 15, after "occurrence" insert -- of --

Signed and sealed this 18th day of April 1972.

(SEAL)
Attest:

EDWARD M. FLETCHER, JR.        ROBERT GOTTSCHALK
Attesting Officer        Commissioner of Patents